United States Patent [19]

Isshiki

[11] Patent Number: 4,622,616
[45] Date of Patent: Nov. 11, 1986

[54] THIN FILM MAGNETIC HEAD FOR EQUALIZING OUTPUTS OF A TWO-CHANNEL TRACKING DEVICE

[75] Inventor: Masanori Isshiki, Yokohama, Japan

[73] Assignee: Kabushiki Kaisha Toshiba, Kawasaki, Japan

[21] Appl. No.: 673,799

[22] Filed: Nov. 21, 1984

[30] Foreign Application Priority Data

Nov. 25, 1983 [JP] Japan .................. 58-221840

[51] Int. Cl.$^4$ .......... G11B 5/28; G11B 5/22; G11B 5/42
[52] U.S. Cl. .................. 360/122; 360/126; 360/128
[58] Field of Search .......... 360/121, 122, 123, 128, 360/126; 29/603; 51/165.74

[56] References Cited

U.S. PATENT DOCUMENTS 4,409,632 10/1983 Kanai et al. ............... 360/122
4,458,279 7/1984 Katz ........................ 360/121

FOREIGN PATENT DOCUMENTS 52-38402 9/1977 Japan .
0029832 3/1981 Japan ...................... 360/122

Primary Examiner—Robert S. Tupper
Attorney, Agent, or Firm—Schwartz, Jeffery, Schwaab, Mack, Blumenthal & Evans

[57] ABSTRACT

The thin film magnetic head in accordance with the present invention for recording information on magnetic recording medium with two channels comprises a head-forming base, a pair of head sections formed on the base with a predetermined separation, a depth detection mark formed at the center of the separation between the head sections for detecting the length of the gap depth of the head sections, and a holding plated arranged opposite to the head-forming base to hold, the head sections and the depth detection mark therebetween. The depth detection mark is so arranged as to form an isosceles triangle, with its base extending along the head-forming base situated on the side facing to the recording medium, and its vertex located, facing to the base of the isosceles triangle, on the depth end line of the gaps of the head sections, on the side which is not facing the recording medium, as well as on the center line between the head sections.

7 Claims, 4 Drawing Figures

THIN FILM MAGNETIC HEAD FOR EQUALIZING OUTPUTS OF A TWO-CHANNEL TRACKING DEVICE

BACKGROUND OF THE INVENTION

1. Field of the Invention

The present invention relates to a thin film magnetic head constructed for two-channel tracking, more particularly, to a thin film magnetic head which is capable of adjusting equalization between the outputs of the two channels.

2. Description of the Prior Art

According to the prior art, a thin film magnetic head is covered by a firm adhesive layer, a protective holding plate, or the like, because of the mechanical weakness of the thin film layer. Due to this, the magnetic gap in the magnetic head is opaque from the outside, making it difficult to adjust precisely the depth of the magnetic gap (gap depth) at the time of manufacturing the magnetic head. For this reason, thin film magnetic heads with the construction in which a plurality of gap depth detection marks are installed on both sides of the magnetic core of the magnetic head for adjusting the gap depth have been known in the past. A thin film magnetic head of this type has been disclosed in Japanese Patent Publication for Opposition No. 52-38402.

Now, in making a two-channel thin film magnetic head to be used for a two-channel head recording device for revolving memory sheets(for example, a device in which frame memories are obtained by recording one field on each of the adjacent tracks), it was necessary to obtain equal output characteristic between the channels. Therefore the gap depths of the bead sections of both channels are made so as to have an indential size.

Moreover, in order to realize satisfactory interfacing the head with the revolving magnetic sheet, it is desirable to choose the form of the head surface opposite to the magnetic sheet to be roundish with the gap section as the crest, and also to give gentle curvatures to both sides of the head surface in the direction of the track width. Therefore, it is difficult to install depth detection marks on both sides of the head sections of the two channels in the manner like in the prior art construction. That is, in forming curved surfaces on both sides of the head, it is impossible to realize precisely the radii of curvature that are defined delicately, and hence it is difficult to preset the positions of the detection marks.

For the reasons described in the above, new gap adjusting means particularly for the two-channel thin film magnetic head has been required.

SUMMARY OF THE INVENTION

An object of the present invention is to provide a thin-film magnetic head which permits an easy adjustment of the gap depth thereof without adversely affecting the form of the head surface opposite to the magnetic recording medium.

An object of the present invention is to provide a method of adjusting the gap depth of the thin film magnetic head without adversely affecting the form of the surface opposite to the magnetic recording medium.

Another object of the present invention is to provide a thin film magnetic head which is capable of equalizing the respective characteristic of the head section of the two channels.

Another object of the present invention is to provide a thin film magnetic head which is capable of reducing the cross-talks between the two channels.

Briefly described, these and other objects of the present invention are accomplished by the provision of an improved thin film magnetic head which includes a base for forming the head, at least a pair of head sections formed on the base with predetermined separations between them, a depth detection mark which is formed at the middle of the mutual separation between the head sections for detecting the length of the gap depth of the head section, and a holding plate arranged opposite to the head-forming base to hold the head sections and the depth detection mark therebetween. The depth detection mark is so arranged as to form an isosceles triangle whose base extends along the head-forming base on the side facing to the recording medium, and whose vertex is located, facing the triangle's base, on the center line between the head sections as well as on the depth end line of the gaps of the head sections on the side which is not face to the recording medium.

BRIEF DESCRIPTION OF THE DRAWING

These and other objects, features, and advantages of the present invention will be more apparent from the following description of a preferred embodiment taken in conjunction with the accompanying drawings in which.

DESCRIPTION OF THE PREFERRED EMBODIMENTS

Figure 1:
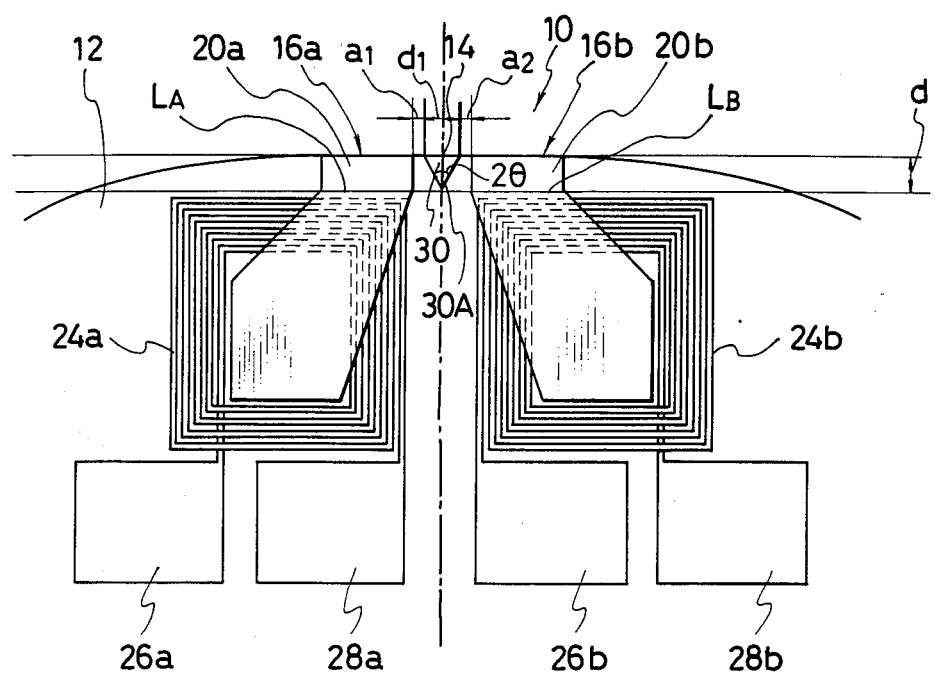
FIG. 1 is a front view of a thin film magnetic head embodying the present invention in which the holding plate has been removed.
Figure 2:
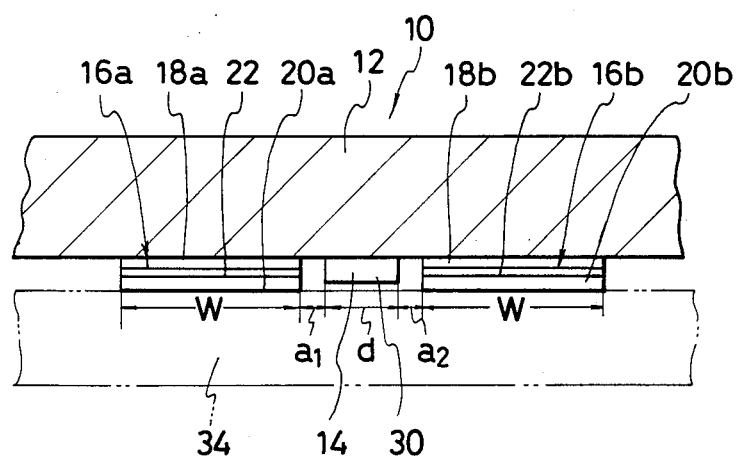
FIG. 2 is an enlarged plan view as seen from the recording medium side of the thin film magnetic head shown in FIG. 1.

Referring to Fig.1 and 2, there is shown a thin film magnetic head embodying the present invention with the reference numeral 10, where the thin film magnetic head 10 has a head-forming base 12 which is made of nonmagnetic material. On the base 12, there are formed symmetrially a pair of head sections 16a and 16b, with a guard section 14 therebetween, to correspond to the tracks of the two channels.

The head section 16a includes of a first magnetic core 8a and a second magnetic core 20a which are made of soft magnetic thin film such as permalloy, amorphous alloy, and the like, a nonmagnetic layer 22a which is made of a relatively hard material such as $ZrO_2$, $SiO_2$, $Al_2O_3$, and others to form a magnetic gap g. The head section 16a further includes a wiring 24a, wound in a spiral form, of a nonmagnetic conductor like Cu, Au, Al, and so forth.

The second magnetic core 20a is formed so as to maintain a space from the first magnetic core 18a for a part of it. The wiring 24a pass through the opening thus created so as to have terminals 26a and 28a on its both ends.

The head section 16b also includes a first magnetic core 18b and a second magnetic core 20b, a nonmagnetic layer 2b which forms a magnetic gap g, and a wiring 24b with terminals 26b and 28b on its ends. The section 16b is mode of the same material as for the head section 16a, and is formed symmetrical to it.

Figure 3:
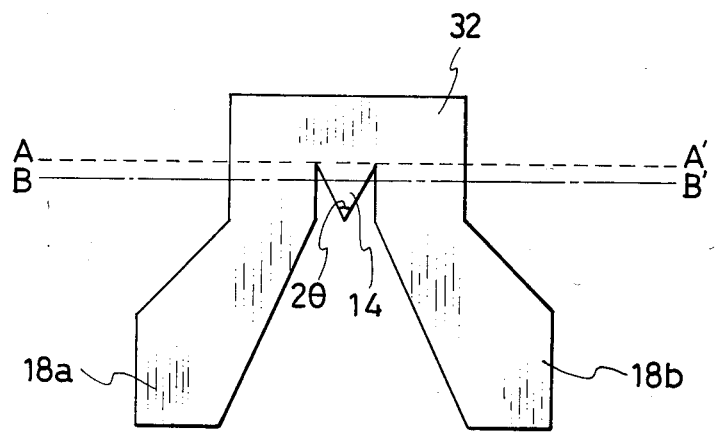
FIG. 3 is a front view which shows the first magnetic core and the depth detection mark that are formed simultaneously by the use of the same mask.

Next, at the center of the guard section 14, there is formed a depth detection mark 30 for detecting the length d of the gap depth. Namely, the depth detection mark 30 is constructed as an isosceles triangle with its base of length d on the section facing to the magnetic recording medium. The vertex 30A of the triangle, which faces the base, containing a vertical angle (of size $2^\theta$) is located on the center line between the two head sections 16a and 16b at a distance d from the base. Therefore the vertex 30A is situated in such a way as to form an approximate straight line with the lower edges, namely, the depth end lines $L_A$ and $L_B$, of the head sections 16a and 16b, respectively, of both channels. Accordingly, with the vertical angle $2\theta$ of the depth detection mark 30, a relation $\tan\theta = \frac{1}{2}$ is held from FIG. 1. The material for the depth detection mark 30 need not be specified. In the event that the same material as for the magnetic cores 18a, 18b, 20a, and 20b is to be used, the mark 30 may be formed as shown in FIG. 3, for example, by utilizing the same mask as used for the process of formation of the first magnetic cores 18a and 18b. With this procedure, the relative positional accuracy of the depth detection mark 30 to the head sections 16a and 16b can be improved. Namely following the formation of a soft magnetic thin film 32 in the form as shown in FIG. 3, desired depth detection mark 30 can be obtained by lapping to an appropriate depth line B—B'. As is clear from FIG. 3, lapping has to be done beyond the line A—A' for which the width of the guard section 14 and the length of the gap depth become equal. This is because, by construction, the depth length is always less than the width of the guard section 14. Whether the depth lengths of the head sections 16a and 16b of the two channels are equal can be checked by carrying out lapping, while measuring $a_1$ abd $a_2$, so as to have $a_1 = a_2$ where $a_1$ and $a_2$ are the distances from the heads 16a and 16b to the depth detection mark 30. If $a_1 = a_2$ holds, the depth detection mark 30 forms an isosceles triangle, without inclination of the surface of the magnetic recording medium, so that it is possible to equalize the lengths of the gap depth of both heads 16a and 16b. Moreover, the base and the height of the isosceles triangle are equal in this case, and since the height is equal to the length d of the gap depth, so that it is possible to know the length d of the actual gap depth by observing the length of the base. When $a_1 \neq a_2$, the depth detection mark 30 does not form an isosceles triangle and the surface of the magnetic recording medium inclines, resulting in unequal lengths of the gap depth for the two heads 16a and 16b.

Furthermore, on the opposite side of the head-forming base 12, a holding plate 34 of nonmagnetic material as indicated by the dotted lines in FIG. 2 is attached through the heads 16a and 16b and the depth detection mark 30.

In the thin film magnetic head of this invention, the depth detection mark 30 can be seen from the side opposite to the magnetic recording medium. Therefore, by realizing the condition $a_1 = a_2$ through observation on the length of the depth detection mark 30 and the distances $a_1$ and $a_2$ from the two heads 16a and 16b to the depth detection mark 30, the lengths of the gap depth of both heads 16a and 16b may be equalized, and moreover, manufacture of a head with desired gap length d can be accomplished in a precise and easy manner.

Moreover, even during the use of the head for reproducing, it is possible to execute a readjustment of the gap depth as the need arises based on the results of observation on the base length of the depth detection mark 30 and the distances from both heads 16a and 16b to the depth detection mark. Furthermore, the head in accordance with the present invention provides an advantage of reducing the level of the cross-talks between the two channels, since the depth detection mark 30 acts as a magnetic shield by forming it with the same kind of material, such as soft magnetic thin film, as for the magnetic cores 18a, 18b, 20a, and 20b.

Figure 4:
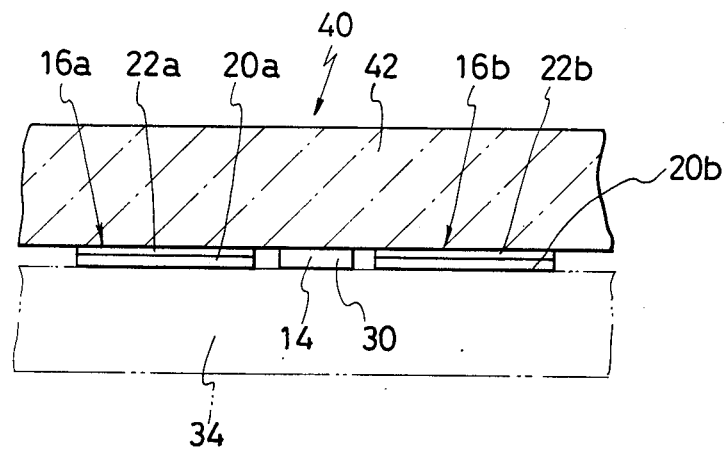
FIG. 4 is an enlarged plan view of another embodiment of the present invention.

Referring to FIG. 4, another embodiment in accordance with the present invention is shown with the reference numeral 40.

In the embodiment shown in FIG. 1 and 2, the head sections 16a and 16b are formed by pairs of magnetic cores 18a, 20a and 18b, 20b, respectively. In the present embodiment, however, the head-forming base 42 is made of a soft magnetic material such as Mn Zn ferrite which is substituted for the first magnetic cores 18a and 18b to form the head sections 16a and 16b together with the second magnetic cores 20a and 20b. Similar effects as for the first embodiment can be achieved also by means of this new embodiment. For facilitating the understanding, the elements in FIG. 4 corresponding to the same elements in FIG. 1 and 2 are represented by the same references.

Various modifications will become possible for those skilled in the art after receiving the teachings of the present disclosure without departing from the scope thereof.

What is claimed is:

1. A thin film magnetic head for recording information on a recording medium with at least two channel tracks, comprising:
    a head-forming base;
    at least one pair of head sections formed on said head-forming base;
    a depth detection mark formed at the middle of the separation between said head sections for detecting the lengths of the gap depth of said head sections, said depth detection mark being arranged so as to form an isosceles triangle whose base extends along said head-forming base on the side facing to said recording medium, and whose vertex is located, facing the base of the isosceles triangle, on the depth end line of the gaps of the head sections on the side which is not facing said magnetic recording medium as well as on the center line between said head sections; and
    a holding plate arranged opposite to said head-forming base to hold said head sections and depth detection mark therebetween.

2. A thin film magnetic head as claimed in claim 1, in which the base of said depth detection mark is approximately of same length as the length of the gap depth of the head section.

3. A thin film magnetic head as claimed in claim 1, in which the length of the base of said depth detection mark and the length from the center of the base of said depth detection mark to the vertex are equal.

4. A thin film magnetic head as claimed in claim 1, in which said head-forming base comprises a nonmagnetic material.

5. A thin film magnetic head as claimed in claim 4, in which said head section comprises a first magnetic core, a second magnetic core, a nonmagnetic layer which forms a magnetic gap, and a wiring.

6. A thin film magnetic head as claimed in claim 5, in which said depth detection mark is simultaneously formed with at least one of said first and second magnetic cores by using same material.

7. A thin film magnetic head as claimed in claim 1, in which said head-forming base is mode of a magnetic material, and said head section comprising a magnetic core, a nonmagentic layer forming a magnetic gap, and a wiring.

* * * * *